Feb. 17, 1959 C. A. WOOLDRIDGE 2,873,550
MINNOW BUCKET
Filed Aug. 20, 1957 2 Sheets-Sheet 1
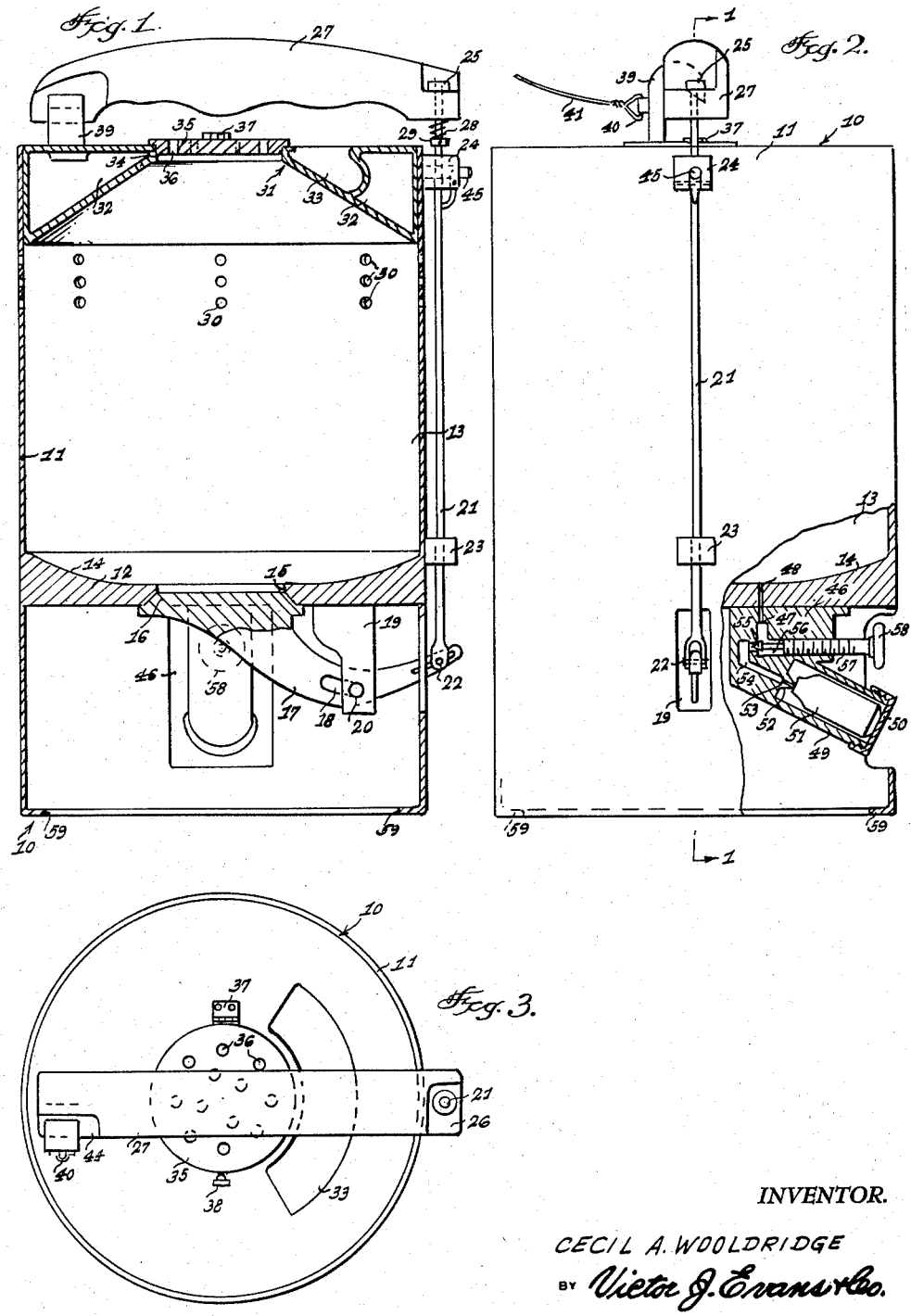
INVENTOR.
CECIL A. WOOLDRIDGE
BY *Victor J. Evans & Co.*
ATTORNEYS

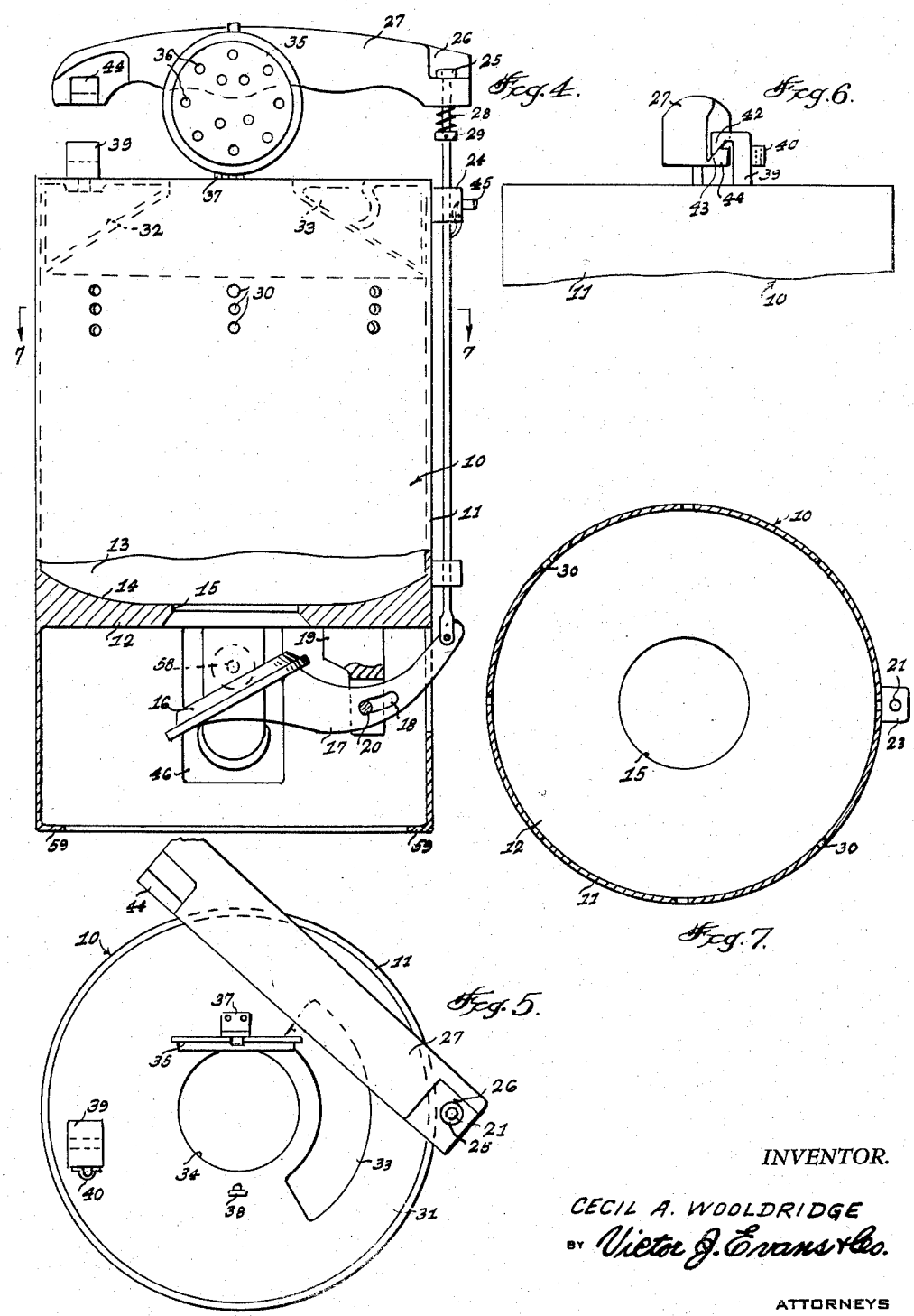

United States Patent Office 2,873,550
Patented Feb. 17, 1959

2,873,550

MINNOW BUCKET

Cecil A. Wooldridge, Tulsa, Okla.

Application August 20, 1957, Serial No. 679,197

2 Claims. (Cl. 43—57)

This invention relates to fishing accessories, and more particularly to a bucket for holding bait or fish such as minnows.

The object of the invention is to provide a bucket for holding fish such as minnows whereby the fish can be readily transported from place to place as desired.

Another object of the invention is to provide a minnow bucket which is constructed so that the minnows can be readily positioned in or removed from the bucket, and wherein there is provided a means for introducing oxygen into the water in the bucket or container so that the fish will remain alive until they are needed for bait or the like.

A further object of the invention is to provide a minnow bucket which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of the minnow bucket, constructed according to the present invention, and taken on the line 1—1 of Figure 2, and showing the plug in closed position.

Figure 2 is a view taken at right angles to the view shown in Figure 1, and with parts broken away and in section.

Figure 3 is a top plan view of the device, with the parts in the position shown in Figure 1.

Figure 4 is a view similar to Figure 1, but showing the parts in shifted or adjusted position as when the plug is open.

Figure 5 is a top plan view of the apparatus with the parts shown as in Figure 4.

Figure 6 is a fragmentary end elevational view showing the handle.

Figure 7 is a sectional view taken on the line 7—7 of Figure 4.

Referring in detail to the drawings, the numeral 10 designates a container or bucket which includes an annular side wall 11 and a bottom wall 12, and the bottom wall 12 may be provided with an upper arcuate surface 14. The interior of the container is indicated by the numeral 13, and the interior 13 is adapted to hold a suitable quantity of water and fish such as minnows which may be used for bait or the like.

The bottom wall 12 is further provided with a central opening 15, and a plug or closure 16 is mounted for movement into and out of closing relation with respect to the opening 15.

A mechanism is provided for moving the plug 16 into and out of engagement with the opening 15, and this mechanism comprises an arm 17 which extends from the plug 16. The arm 17 is provided with a slot 18, and a pivot pin 20 extends through the slot 18 and through a support member 19 which depends from the bottom wall 12. A vertically disposed shiftable rod 21 has its lower end pivotally connected to the arm 17 by means of a pivot pin 22, Figure 1, and the rod 21 may be supported by bearing blocks 23 and 24 which extend outwardly from the side wall 11 of the container. A head 25 is mounted on the upper end of the rod 21, and the head 25 may be seated in a recess 26 of a manually operable handle 27. A coil spring 28 is circumposed on the upper portion of the rod 21, and the coil spring 28 abuts a collar 29 which is mounted on the rod.

There is further provided in the top of the bucket a body member 31, and the side wall 11 of the device may be provided with a plurality of apertures or openings 30. The body member 31 is shaped to include compartments 32 which serve as float chambers so that the device will remain buoyant in the water. There is further provided in the body member 31 a recessed portion 33 which defines a hand grip so as to facilitate manipulation of the device. An opening 34 is arranged in the central portion of the body member 31, and a closure member 35 is mounted for movement into and out of engagement with the opening 34. The closure member 35 is provided with a plurality of apertures 36. A hinge 37 may hingedly connect the closure 35 to the body member 31, and a latch 38 may be provided for retaining the closure 35 in its closed position.

Extending upwardly from the top of the body member 31 and secured thereto in any suitable manner, is a lug 39 which is provided with a transverse finger 42, Figure 6. A bracket 40 is secured to the lug 39, and a suitable cable or rope 41 is adapted to be arranged in engagement with the bracket 40, whereby the device can be connected to a boat, pier or the like. The handle 27 is provided with a slot 43 which defines a lip 44, and the lip 44 is mounted for movement into and out of engagement with the finger 42 of the lug 39.

A latch 45 may be provided for retaining the rod 21 immobile in its adjusted positions, and the latch 45 can be manually operated when the rod 21 is to be shifted by means of the handle 27.

Depending from the bottom 12 and secured thereto or formed integral therewith is a base 46, Figure 2, and the base 46 may be provided with a passageway 47 which communicates with a passageway or channel 48 in the bottom wall 12. The base 46 may be further provided with a casing or compartment 49 which has a cap 50 threadedly arranged in engagement therewith. Mounted in the casing or compartment 49 is a container 51 which is adapted to hold a suitable quantity of oxygen, and an end of the container 51 is adapted to be pierced by a pointed element 52 which is provided with an opening or bore 53 therein. The oxygen from the container 51 can then flow through a passageway 54. A valve seat 55 is arranged between the passageway 54 and the passageway 47, and a valve member 56 is mounted for movement into and out of closing relation with respect to the valve seat 55. The valve member 56 is arranged on an end of a threaded shank or stem 57, and a knob or handle 58 is provided for rotating the shank 57 so that the valve member 56 can be moved into and out of engagement with the valve seat 55.

From the foregoing, it is apparent that there has been provided a bucket or container which is especially suitable for use in holding and transporting fish or bait such as minnows. In use, the closure 35 may be raised and then a suitable quantity of fish can be placed in the compartment 13 within the container 10. Then, the closure 35 can be moved to its closed position as shown in Figure 1 and the entire device may be positioned in the water and can be tied to a boat or pier by means of the line 41. The compartments 32 insure that the device is sufficiently buoyant so that it will float in the water. By rotating the handle 58, the valve member 56 can be moved into and out of engagement with the valve seat 55 so that oxygen from the container 51 will pass through the aperture 53 in the pointed member 52. The pointed member 52 can be used to pierce an end of the container 51 which holds the oxygen. This oxygen then passes through the passageway 54, then past the valve seat 55, and then through the registering passageways 47 and 48 so that the water within the container will have a desired or proper amount of oxygen intermixed therewith so that the fish will be kept alive. The apertures 30 permit water to circulate therethrough so that there is always present a quantity of fresh water. When it is desired to open the plug 16 from the position shown in Figure 1 to the position shown in Figure 4, it is only necessary to first depress or press down on the handle 27 so as to compress the coil spring 28. This downward movement of the handle 27 permits the lip 44 on the handle 27 to clear the finger 42 so that the handle 27 can be rotated or swung from the position shown in Figure 3 to the position shown in Figure 5 whereby upon raising the handle 27, the rod 21 will be raised and this will pivot the arm 17 to thereby open the plug 16.

When the bucket is submerged in the water, the only thing which is exposed out of the water is the swinging handle 27. The bucket is cylindrical in shape and can be made of any suitable material and of different sizes. The catch or latch 45 can be used for retaining the rod 21 in its various adjusted positions. By moving the handle 27, the plug 16 can be moved into and out of open or closed position. The closure 35 prevents the minnows from jumping out of the bucket. The lid 35 can be opened and closed when removing minnows as for example when the hook is to be baited. The curved surfaces 14 in the bottom wall 12 facilitate the cleaning of the bucket. The wall 12 may be spaced above the bottom of the device, and the bottom of the bucket may be provided with inwardly extending portions or feet 59 which can be used for supporting the device when out of water. The capsule or container 51 can be removed and replaced when desired. The pointed element 52 punctures the end of the capsule 51 so as to permit oxygen to pass therefrom. The spring 28 helps maintain the handle 27 in closed position when the parts are in the position shown in Figures 1, 2 and 3. By tightening up on the cap 50, the capsule 51 will be biased against the prong 52 to puncture the capsule. By rotating the valve 57 by means of the handle 58, different amounts of oxygen can be fed into the bucket.

When loading the minnows into the bucket from a vat or the like, the handle 27 may be moved from the position shown in Figure 1 to the position shown in Figure 4 or 5 and then the bucket can be positioned in the vat on top of the water. Thus, the plug 16 is opened as shown in Figures 4 and 5 so that the bucket will gradually submerge itself. Then, the bucket can be loaded with five or six dozen minnows and after it has been loaded the handle 27 can be actuated to close the plug 16 so that the fish will be retained therein. The valve 57 can be adjusted so that the proper amount of oxygen will be fed into the device. Then, the bucket can be placed in the trunk of a vehicle or other location for transportation to the fishing grounds. After arriving at the fishing grounds, the bucket can be set on top of the water and if desired the plug 16 can again be opened so that the bucket will submerge whereby there will be a circulation of fresh water through the bucket so that the fish will remain in good condition. When it is desired to move to a different location, it is only necessary to close the plug 16, remove the bucket and the device can be used over and over again.

I claim:

1. In a fish holding device, a hollow container including an annular side wall, a bottom wall provided with a central opening therein, means for pivotally mounting a plug on said bottom wall adjacent said opening for movement into and out of closing relation with respect to said opening, said means comprising a support member depending from said bottom wall, and an arm secured to said plug and pivotally connected to said support member, a vertically disposed rod having its lower end pivotally connected to said arm, bearing blocks on said side wall engaging said rod for maintaining said rod in parallel relation to said side wall, a handle pivotally connected to the upper end of said rod and provided with a slot therein defining a lip, and a lug extending upwardly from the top of said container and provided with a finger for selective engagement by said lip.

2. A structure as defined in claim 1; and further including a collar mounted on said rod adjacent said handle, and a coil spring circumposed on said rod and abutting said collar and said handle to maintain said handle in closed position with the lip in engagement with said lug.

References Cited in the file of this patent

UNITED STATES PATENTS

| | | |
|---|---|---|
| 1,444,412 | Codner | Feb. 6, 1923 |
| 1,731,921 | Coleman et al. | Oct. 15, 1929 |
| 1,896,827 | Neely | Feb. 7, 1933 |
| 2,250,942 | Allin | July 29, 1941 |
| 2,259,814 | Green et al. | Oct. 21, 1941 |
| 2,573,352 | Nicodemus | Oct. 30, 1951 |
| 2,624,973 | Wilcox et al. | Jan. 13, 1953 |
| 2,693,661 | Piker et al. | Nov. 9, 1954 |

FOREIGN PATENTS

| | | |
|---|---|---|
| 488,785 | Canada | Dec. 16, 1952 |